US008200616B2

(12) United States Patent
Boldyrev et al.

(10) Patent No.: US 8,200,616 B2
(45) Date of Patent: Jun. 12, 2012

(54) METHOD, APPARATUS, AND COMPUTER PROGRAM PRODUCT FOR POLYNOMIAL-BASED DATA TRANSFORMATION AND UTILIZATION

(75) Inventors: Sergey Boldyrev, Söderkulla (FI); Ian Justin Oliver, Söderkulla (FI); Jukka Honkola, Espoo (FI); Antti Lappetelainen, Espoo (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 12/347,031

(22) Filed: Dec. 31, 2008

(65) Prior Publication Data

US 2010/0169346 A1    Jul. 1, 2010

(51) Int. Cl.
*G06F 7/00* (2006.01)

(52) U.S. Cl. .................... 707/602; 707/756

(58) Field of Classification Search ............... 707/602
See application file for complete search history.

(56) References Cited

U.S. PATENT DOCUMENTS

| 6,665,405 | B1 | 12/2003 | Lenstra |  |
|---|---|---|---|---|
| 2006/0026152 | A1* | 2/2006 | Zeng et al. | 707/5 |
| 2008/0215510 | A1* | 9/2008 | Regli et al. | 706/12 |

FOREIGN PATENT DOCUMENTS

| WO | WO 2007/121587 A1 | 11/2007 |
| WO | WO 2008/047246 A2 | 4/2008 |

OTHER PUBLICATIONS

Lassila: "Taking the RDF Model Theory Out for a Spin," *The Semantic Web—ISWC 2002, Lecture Notes in Computer Science* 2342, pp. 307-317, 2002.
Dubois et al., "Ordinal and probabilistic representations of acceptance," *J. Artificial Intelligence Research*, 22, pp. 23-56, Jul. 2004.
Dubois et al., "On the use of aggregation operations in information fusion processes," *Fuzzy Sets and Systems*. 142, pp. 143-161, 2004.
Ponomaryov, "A decomposability criterion for elementary theories," Siberian Mathematical Journal, vol. 49, No. 1, pp. 152-154, 2008.
Rabin, "Efficient Dispersal of Information for Security, Load Balancing, and Fault Tolerance," Journal of the ACM, vol. 36(2), pp. 335-348, Apr. 1989.
Shoup, "New algorithms for finding irreducible polynomials over finite fields," *Mathematics of Computation* 54:435-447, 1990; extended abstract in *Proc. 29th Annual Symposium on Foundations of Computer Science*, pp. 283-290, 1988.
Oliver et al., "Personal Semantic Web Through a Space Based Computing Environment," *In proceedings: Middleware for the Semantic Web, Seconds IEEE International Conference on Semantic Computing*, Aug. 4-7, 2008.

(Continued)

*Primary Examiner* — Fazul Quader
(74) *Attorney, Agent, or Firm* — Ditthavong Mori & Steiner, P.C.

(57) ABSTRACT

An apparatus for polynomial based data transformation may include a processor. The processor may be configured to identify data that is relevant to a set of one or more queries and generate an information source vector that indicates information sources associated with the data. The processor may also be configured to generate a cyclotomic polynomial based on the information source vector and factor the cyclotomic polynomial to generate a plurality of orthogonal data signatures. Associated methods and computer program products may also be provided.

19 Claims, 4 Drawing Sheets

OTHER PUBLICATIONS

Rabin, "Probabilistic algorithms in finite fields," *SIAM Journal on Computing*, vol. 9, No. 2, pp. 273-280, Jan. 1979.

Berlekamp, "Factoring polynomials over large finite fields," *Mathematics of Computation*, vol. 24, pp. 713-735.

Shoup, "On the deterministic complexity of factoring polynomials over finite fields," *Computer Science Technical Report No. 782*, University of Wisconsin-Madison, Feb. 1989.

Ben-Or, "Probabilistic algorithms in finite fields," *SIAM Journal of Computing*, vol. 9, No. 2, pp. 273-280, Jan. 1979.

International Search Report and Written Opinion for the corresponding PCT Application PCT/FI2009/050737 dated Dec. 29, 2009, pp. 1-13. Applicant: Nokia Corporation et al.

\* cited by examiner

METHOD, APPARATUS, AND COMPUTER PROGRAM PRODUCT FOR POLYNOMIAL-BASED DATA TRANSFORMATION AND UTILIZATION

TECHNICAL FIELD

Embodiments of the present invention relate generally to information transformation for storage and retrieval, and, more particularly, relate to a method, apparatus, and a computer program product for polynomial-based data transformation and utilization.

BACKGROUND

The modern communications era has brought about a tremendous expansion of wireless networks. Various types of networking technologies have been, and are being developed resulting in unprecedented expansion of computer networks, television networks, telephony networks, and other communications networks. As new networking technologies evolve, consumer demand continues to fuel increased innovation with respect to utilization of networks. Wireless and mobile networking technologies continue to address related consumer demands, while providing more flexibility and immediacy of information transfer.

With an associated increase in the utilization of communications and other computing devices, information management within and between devices has become increasingly important. In this regard, information may be stored in a variety of locations and in a variety of forms. For example, information may be stored such that it is accessible via a network, such as on a data server. Alternatively, information may be stored on memory that is local to a device, such as on a hard drive or a flash memory. Further, data may be stored in different forms such as in an encrypted form for security purposes.

Regardless of the location or form in which data is stored, a risk of data loss can exist. Data loss can result from user error, hardware failure due to, for example, damage to a memory device, or through the loss of connectivity to a device maintaining the data. In some instances, such as in smart space or dynamic distributed device environments, where devices and associated data may connect or disconnect at any time, data loss can be increasingly problematic due to the potential of frequent and unpredictable disconnections.

Accordingly, mechanisms for avoiding data loss have value, since, in many instances, lost data may result in lost time and effort. As a result, data consumers often rely upon redundancy of data storage such as via backup storage or other redundancy mechanisms. Unfortunately, redundancy mechanisms often require double the storage capacity, and require substantial communication resources to move data to the redundant storage location.

BRIEF SUMMARY

A method, apparatus, and computer program product are described that provide for generating data signatures that, in some embodiments, are used to assist in the prevention of data loss. In this regard, example embodiments of the present invention transform or synthesize partial data closures, for example via cyclotomic polynomial extensions, into irreducible polynomial expressions or data signatures. The partial data closures may be local to a device, such as a device within, for example, a dynamic distributed device network, and may be generated based on a received set of one or more queries.

In some example embodiments, the data signatures represent smaller sized data packages, relative to partial data closures, that may be used to reproduce a full or deductive data closure through a process of combination and transformation. According to various example embodiments, the data signatures may be dispersed within, for example, a smart space using a dispersion technique such as a uniform or skewed/non-uniform dispersion technique. Due to changes in a dynamic distributed device network and/or associated changes to data within the network, data signatures may be regularly or irregularly re-synthesized or updated to ensure that the data signatures accurately represent the data upon which the data signatures are based. The data signatures may be subsequently stored to facilitate use of the data signatures with respect to later queries.

In particular, according to various example embodiments, data may be identified that is relevant to a set of one or more queries. The location of the relevant data and/or the identification of the information sources (e.g., information stores) storing the relevant data, within, for example, network or a memory device, may also be determined. Based on the identification of the information sources that hold relevant information or data, an information source vector can be generated. The information source vector may, as a result, indicate where relevant data to the set of queries may be found. The information source vector may also be verified by determining whether an equivalence class representation of the information vector can be generated. The information source vector may then be used to generate a cyclotomic polynomial. The cyclotomic polynomial may then be factored to generate a plurality of orthogonal data signatures. By generating the data signatures in this manner, two or more data signatures of the plurality of data signatures may be combined to reconstruct the cyclotomic polynomial and, accordingly, the original data used to generate the cyclotomic polynomial. In some example embodiments, dispersion of the data signatures to information stores of a dynamic distributed device environment can be advantageous since data loss may be decreased by the combination properties associated with the data signatures.

An effect of some example embodiments of the invention is also to reduce the burden on the communications infrastructure of a dynamic distributed device network with respect to utilization of the relatively smaller sized data signatures relative to partial closures of the data. Energy efficiencies are also realized by example embodiments due to the reduced burden on communications infrastructure and the storage of data. Example embodiments are also device platform independent and allow for different device platforms to interact within the constraints of the solution. Further, example embodiments of the present invention also limit data loss through the ability to recreate a data set with lesser sized pieces of information.

An example embodiment of the present invention is an apparatus for polynomial-based data transformation and utilization. The example apparatus may include a processor, and the processor may be configured to identify data that is relevant to a set of one or more queries and generate an information source vector that indicates information sources associated with the data. The processor may also be configured to generate a cyclotomic polynomial based on the information source vector and factor the cyclotomic polynomial to generate a plurality of orthogonal data signatures.

In another example embodiment of the present invention, a computer program product for polynomial-based data transformation and utilization is provided. The example computer program product includes at least one computer-readable storage medium having executable computer-readable program code instructions stored therein. The computer-readable program code instructions may be configured to identify data that is relevant to a set of one or more queries and generate an information source vector that indicates information sources associated with the data. The program code instructions may also be configured to generate a cyclotomic polynomial based on the information source vector and factor the cyclotomic polynomial to generate a plurality of orthogonal data signatures.

Yet another example embodiment of the present invention is a method for polynomial-based data transformation and utilization. The example method includes identifying data that is relevant to a set of one or more queries and generating an information source vector that indicates information sources associated with the data. The example method also includes generating a cyclotomic polynomial based on the information source vector and factoring the cyclotomic polynomial to generate a plurality of orthogonal data signatures.

An additional example embodiment of the present invention is an apparatus for polynomial-based data transformation and utilization. The example apparatus includes means for identifying data that is relevant to a set of one or more queries and means for generating an information source vector that indicates information sources associated with the data. The example apparatus also includes means for generating a cyclotomic polynomial based on the information source vector and means for factoring the cyclotomic polynomial to generate a plurality of orthogonal data signatures.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. As used herein, the terms "request," "message," and similar terms may be used interchangeably to refer to communications within a smart space in accordance with embodiments of the present invention. As used herein, the term "local," with respect to a device, refers to an aspect that is on or within the same device, and the term "remote," with respect to a device, refers to an aspect that is off the device and possibly on a separate device that may be accessed via a network. Further, as used herein, the term "message," and similar terms may be used interchangeably to refer to communications within a smart space in accordance with embodiments of the present invention. Moreover, the term "exemplary," as used herein, is not provided to convey any qualitative assessment, but instead to merely convey an illustration of an example.

Example embodiments of the present invention may be used in a variety of settings that involve the storage of data. Some example embodiments may be used within the context of a dynamic distributed device network, such as a smart space. While some of the example embodiments described below are described with respect to application within a dynamic distributed device environment, it is contemplated that the example embodiments are equally applicable to centralized and/or static network environments, internal device environments (e.g., within a memory device of an electronic device, etc.), or the like.

With regard, to dynamic distributed device environments, such as smart spaces, the architecture may be defined as a dynamic, ad hoc, distributed device network having a dynamic topology such that any device may leave or enter the network at any time. In some example embodiments, a smart space may include nodes and information stores.

Nodes may be the actors within the smart space, such as applications or other entities that request or otherwise interact with data, for example through the use of queries. In this regard, a node may be any application or portion of an application executed by a device connected to the smart space. A node may be aware of other nodes of the smart space, such as adjacent nodes. The application of a node may be any application that may implement storing, retrieving, computing, transmitting, and receiving information. In various embodiments, a node may be representative of applications being executed by various devices, such that in some exemplary embodiments, a node may be executed by the same device, or one device may execute a plurality of nodes. Further, in some embodiments, a single node may be implemented by more than one device such that the devices share the node.

A node may include an external interface, a node information store interface, and a task. The external interface may consider a node's interaction with the external world (e.g., a user). The node information store interface may be used to transfer information to and retrieve information from an information store via the smart space. The task may define a relationship between the external interface and the node information store interface. For example, if a user wishes to retrieve some information from an information store to a node, a task for the retrieval (e.g., a query message) may be generated. A node may interact with an information store in various manners. In this regard, a node may insert information, remove/retract information, query information, subscribe to an information store by means of the persistent query (e.g., a subscription), and cancel such subscriptions (e.g., unsubscribe). The various types of interactions between the nodes and the information stores may be collectively referred to as requests. A node may communicate the requests to the information store via the smart space, and receive information from the information store via the smart space. A node may be aware of the smart space generally, but need not be aware of the connectivity within the smart space.

Information stores of a smart space, or any other network configuration (e.g., a static network), may be the passive entities that store data. In this regard, information storage within the smart space may be considered free-form in nature, via a semantic, web style or space based information resources. Any device having writable memory and connected to a smart space may implement an information store. In this regard, the devices implementing an information store may be capable of storing, retrieving, computing, transmitting, and receiving information. Accordingly, in some embodiments, an information store may be a logical entity describing a location where information may be stored. According to various embodiments, an information store may span a plurality of devices. The information stores may store information associated with the smart space and information that may be accessed via the smart space.

Since information stores may be implemented by any device that is connected to the smart space, the data of the smart space may be distributed or dispersed within the smart space amongst the information stores. In this regard, data within the smart space may be acted upon by a dispersion algorithm. Any known dispersion algorithm may be utilized to disperse data (e.g., partial data closures, data signatures, etc.) amongst the information stores of a smart space.

In some example embodiments, the dispersion algorithm may also be used to decompose a data set into partial closures (also known as partial data closures) and the partial closures may be dispersed within the smart space. According to various example embodiments, the original data set, or a reliable prediction of the original data set, may be generated from two or more partial closures.

Example embodiments of the present invention may provide for transforming or synthesizing partial closures into irreducible polynomial expressions of a desired degree, or data signatures, using a factoring algorithm or other mathematical techniques (e.g., cyclotomic polynomial extensions) within data storage environments, such as communications networks. In this regard, a query may be received that identifies data (e.g., local data) for generating a partial closure. These data signatures may be considered a relatively lighter version of the partial closures due to the data signatures being smaller in size than the respective partial closures. In some exemplary embodiments, the data signatures are smaller is size because redundant data is eliminated. The data signatures retain sufficient information so as to allow the data signatures to be used for querying functionality. The data signatures may be stored in the information stores of the smart space to facilitate satisfying subsequent queries. The generated data signatures, according to various example embodiments, facilitate efficient information transformation, dissemination and aggregation in the presence of distributed and partial information.

Within an example smart space, various data signatures may be generated in response to a query or other triggering message. In this regard, a local partial closure may be generated. Also, remote data closures, as well as remote data signatures on other devices, may be generated. As such, data signatures may reside on a plurality of devices within a network such as a smart space. According to various example embodiments, the data signatures may be generated in a manner that ensures orthogonality between at least some data signatures on other devices.

In this regard, the content of a query may be transformed using the same technique to generate a target signature. The target signature may be distributed throughout the smart space to facilitate the identification of data signatures that match the requested content of the query. Upon identifying appropriate data signatures, the data signatures may be directly combined to generate a deductive signature. In some example embodiments, the data signatures used in a synthesis operation are orthogonal to each other. The deductive signature may then be transformed, using for example, an access function or key, into a full closure of the data requested by the query. As such, example embodiments of the present invention allow for the target and data signatures to facilitate the reliable and consistent dynamic deduction of the result of a query of data within the smart space via partial, distributed information.

Accordingly, example embodiments of the present invention provide balance between computing closures in advance of a query versus defining an access function. Example embodiments can therefore dynamically, or in an on-demand fashion, generate query results. Further, the procedure of determining the query results may converge to mixed feedback/feed-forward computing of the information gain while balancing the various factors.

In this regard, to consider the current state of a word (e.g., a partial closure or data signature) at least three separate items of the information to be identified or consumed may be presented. The items may be observations pertaining to the current situation, generic knowledge about any similar situations, and beliefs regarding the non-directly observable features of the current situation. In case of the logical approaches, observations and generic knowledge may be encoded in some logic-based language. In probabilistic approaches, generic knowledge may be modeled by a probability distribution on the set of possible situations. Observations may result in the partial instantiation of some variables. Reasoning with respect to the data within a smart space may consist of inferring beliefs from observations, and generic knowledge that seems to be valid across a plurality of situations.

In logical approaches this reasoning may be achieved via logical deduction. In probability theory, the reasoning may follow from computing conditional probabilities of relevant propositions, where the conditioning event may gather the available observations. Observations may be reliable and non-conflicting, while computed beliefs may be, on the contrary, taken for granted. As a result, a strong similarity may exist between the logical and the probabilistic approaches to the reasoning. In some instances, confidence relationships between information compatible with deductive closure mechanisms may be substituted by a family of possibility relations. The family of possibility relations may characterize the same set of accepted beliefs. Therefore, a reliable distributed deductive closure generation can be generated. The task of deductive closure decomposition may converge to the task of searching and allocating a set of the facts (e.g., a data set) within a disjoint transitive closure generated by the nature of a smart space environment. As such, example embodiments of the present invention make use of non-decomposable components, or minimum components, that are sustained and useful for consideration and composition.

To consider the distributed deductive closure generation, the following assumption may be used. Following from decomposability criterion for elementary theories and partition-based logical reasoning for first-order and propositional theories, sets of facts (e.g., data sets) may be recognized as a decomposable deductive closure from the perspective of a corresponding signature. In some instances, this may be true if the deductive closure is in the form of predicate calculus of all sets of the facts of some partial closures with orthogonal signatures. Once joined or synthesized, the orthogonal signatures may produce a complete or deductive data signature.

In this regard, a set of facts (e.g., a data set within one or more information stores) may be represented by a triple form of the facts, namely a Subject-Predicate-Object representation, where the Predicate may be consistent and may thereby facilitate forming a necessary partial closure signature (e.g., data signature) that is orthogonal to any other partial closure signature. The Predicate may therefore shape the set of potential information by purpose and definition. Thus, an issue for distributed deductive closure generation may be to provide a complete or clustered image of the Predicates throughout all accessible information. To provide independence from the Predicates' consistency, some appropriate decomposable fragments in terms of signatures may be generated and identified.

Accordingly, in some example embodiments, there are two closures (e.g., data or deductive) such that their associated signatures may be united to form the signature of a finite deductive closure for the particular information space. In this regard, if a fact (e.g., a subset of the set of facts) exists that is part of the signature of the finite deductive closure, then, according to various example embodiments, there exists at least two other facts (e.g., subsets of the set of facts), such that their corresponding data signatures are orthogonal to the finite deductive closure signature.

Therefore, it follows that each fact (e.g., subset of the set of facts) of a finite deductive closure, which is not decomposable in that closure, contains pieces of information (e.g., Subject-Predicate-Objects) only from one decomposition component of closure. Accordingly, the partitioning of the signature may be used, as well as components of closure, based at least in part on the system of rules (axioms) of closure.

The efficiency and applicability of various embodiments of the present invention are illustrated by the task of deductive closure synthesis and are applicable to any information processing and analysis. As such, given a set of facts and/or queries, the paths to access the set of facts, a predefined format of those facts representation (e.g., Subject-Predicate-Object triple), where one of the formats' fields (e.g., the Predicate field) is consistent across the facts and forms a necessary partial closure that is orthogonal to any other partial closure signature, then some embodiments of the present invention may be implemented to perform distributed deductive closure synthesis.

Considering the signatures framework described above, a valid irreducible polynomial, with a corresponding key, may serve a role for signatures creation and validation. Having orthogonality by definition of polynomial properties and taking the Predicate portion as a consistent representation of a partial closure within all accessible information, exemplary mechanisms for distributed deductive closure synthesis may be described.

With respect to the operation of the network (e.g., smart space), facts or data may be inserted or removed and queries may be inserted and/or satisfied. Further, persistent queries, which may be a particular type of query, also known as a subscription, may also be inserted and/or satisfied. Facts and queries may be distributed or dispersed in a uniform or skewed/non-uniform fashion. Further, in some example embodiments, facts and queries may be encoded by means of some vector. As a result, facts and queries may be taken as input parameters of some predetermined polynomial form and an irreducible polynomial may be used as a dispersing mechanism.

Since irreducible polynomials may be created by means of a factoring algorithm, the resultant irreducible expression may be represented as the product of a desired number of distinct irreducible polynomials of a defined degree. As such, information transfer may be represented through an accumulated set of distinct irreducible polynomials, and information transfer can be translated into one or more irreducible polynomials. Thus, a most relevant first-order logic closure, which is a set of facts with redundancy, may be represented as a predetermined form of polynomial expression.

In this regard, considering a set of aggregate queries $Q=\{q_1, \ldots, q_m\}$, which may include one or more queries, over a set of k distinct information sources (e.g., information stores), a set of information source readings may be defined as a vector $x = \langle x_1, \ldots, x_k \rangle \in \Re$. The query or queries may request, for example, an aggregate value of some subset of the data stored within the information sources. The query or queries may also be associated with a given frequency requesting data, which may be proportional to an associated workload. The information sources may be defined by means of structured or unstructured information entities, such as, for example in a resource description framework (RDF) format, in a binary multimedia stream format, or the like. Each query may be therefore expressed as a k-bit vector referred to as the information source vector.

In this regard, an element of the information source vector may be equal to one if the information source x contributes to a given query. Otherwise the element of the vector may be equal to zero. For example, an element j of the information source vector may be one if $x_j$ contributes to the value of $q_j$. On the other hand, if $x_j$ does not contribute to the value of $q_j$, element j may be zero. In this regard, the element with respect to an example query, $q_j$, and information source readings x may be represented as the dot product of the query and the information source readings ($q_j \cdot x$). As such, the elements of the information source vector may be input parameters of a desired polynomial form.

Upon determining the information source vector, a verification or check may be performed with respect to the information source vector by determining whether an equivalence class may be generated. In this regard, once queries are defined against the information sources, an assumption may be made that all the sets of aggregated queries in the workload have the same frequency. In other words, $$\frac{1}{Q^I_{WL_1}} = \frac{1}{Q^{II}_{WL_1}} = \ldots = \frac{1}{Q^i_{WL_1}}$$

where $Q_{WL_1}$ is the workload of a set of aggregated queries.

Accordingly, since the aggregated queries have the same frequency, the union of all regions (e.g., information sources) covered by the same set of aggregated queries may be defined as an equivalence class which forms the information set. For example, the set of queries $\{q_1 1, q_2, q_3\}$ may be represented as $\{EC_1, EC_2, EC_3, EC_4\}$ which can be covered by $q_2$ and $q_3$, and can be represented as $[0,0,1]^T$.

If the information source vector is created and checked via the generation of the equivalence class, then it may be possible to deterministically generate an irreducible polynomial over the set of the equivalence class of a given degree. In this regard, construction of the equivalence class indicates that an irreducible polynomial over the finite field F of degree m exists. If m is a prime factorization, then a construction of polynomials may be generated over the finite field F of degree $q_i^{e1}$ for i=1, . . . ,r, and the polynomials may be combined together to form an irreducible polynomial of degree m.

The resultant irreducible polynomial may be used as one productization of a dispersing mechanism. Since the resultant irreducible polynomial may be generated by means of a factoring algorithm, the resultant irreducible polynomial may be represented as the product of a particular number of distinct irreducible polynomials of defined degree.

In this regard, a cyclotomic polynomial $\Phi_1 = X^{q-1} + \ldots + 1$ may be factored to obtain an irreducible polynomial of degree m. The procedure may produce a finite field (e.g., a cyclic group of order $p^m - 1$ where p is a predetermined prime number) and a primitive q-th root of a particular unity in the finite field. The polynomial construction may therefore be reduced to finding the roots of the polynomials of the form $X^q - c$ over the finite field. A reduction from factoring may then be performed at the degree of m to 1. As a result, a set of irreducible polynomials $f^{(1)}, \ldots, f^{(k)}$ may be inductively defined in F of degree m where the roots are primitive $q^i$-th roots of unity. According to some exemplary embodiments, the set of irreducible polynomials may be data signatures for use as described herein.

Via a deterministic factoring algorithm, the example approach provided above may result in a deterministically constructed irreducible polynomial that is the product of k distinct irreducible polynomials of degree l in finite field F, where l contributes to the algorithm execution time. Accordingly, a particular information transfer may be represented through an accumulated set of distinct irreducible polynomials, and the accumulated set of distinct irreducible polynomials may be translated into one irreducible polynomial from the set or components of the set. As a result, according to various example embodiments, a most relevant first-order logic information closure, which is a set of information (facts or queries) with redundancy, may be represented in the form of a polynomial.

Therefore, the task of the common information closure calculation may be reduced to the task of irreducible polynomial updates by repeating the generation of the irreducible polynomials or data signatures. After the irreducible polynomial f of degree m, determined by factoring the cyclotomic polynomial $\Phi_q = X^{q-1} + \ldots + 1$, is constructed, the irreducible polynomial may be updated based on changes in the underlying data or queries and/or changes in, for example, the network topology. Further, algorithms may be considered for factoring the cyclotomic polynomial $\Phi_q$ using n random or provided field elements in $(n \log p)^{O(1)}$ steps.

Further, according to some example embodiments, checking against consistency of synthesized polynomials and aligning them with dissemination and aggregation policies/strategies can also be performed. Further, the process of information transformation as described herein may be bi-directional, meaning that information can be transformed back and forth between the original, underlying data and the polynomial form.

The irreducible polynomials or non-decomposable components of information may be the minimum sustained components of interest for the consideration and further information composition. Evaluating data taken from the information domain (e.g., the original representation of the data) and transforming the data into the irreducible polynomial (e.g., data signatures) may allow for the ability to render information closure in terms of a domain where efficient information processing can be undertaken.

As a result of the above, the task of identifying the most common deductive closure, also known as the D kernel, may be reduced to the task of updating irreducible polynomial expressions representative of the D kernel. Deductive closure synthesis may therefore be an outcome of the updateable irreducible polynomial expressions.

Considering the task of irreducible polynomial updates, the process of deductive closure synthesis (facts closure generation) may play the role of the updating rule of the irreducible polynomial expressions. The updates may be conducted in an aggregated fashion and each update may be monitored and verified with respect to usefulness of the update. If it is determined that an update would not contribute useful information, the respective irreducible polynomial expression may be ignored as well as the associated facts.

Example embodiments also provide a feasible mechanism for shaping an image (e.g., a kernel image) of the deductive closure and for tracking and keeping the most relevant facts readily available. The mechanism can therefore track the most common or useful deductive closure and perform appropriate maintenance based on constraints of the smart space and the devices connected to the smart space. The deductive closure may therefore be assembled by means of the most useful pieces of the information, where the pieces of information may be structured and unstructured. The deductive closure may, as a result, be considered to be both static and dynamic.

Figure 1A:
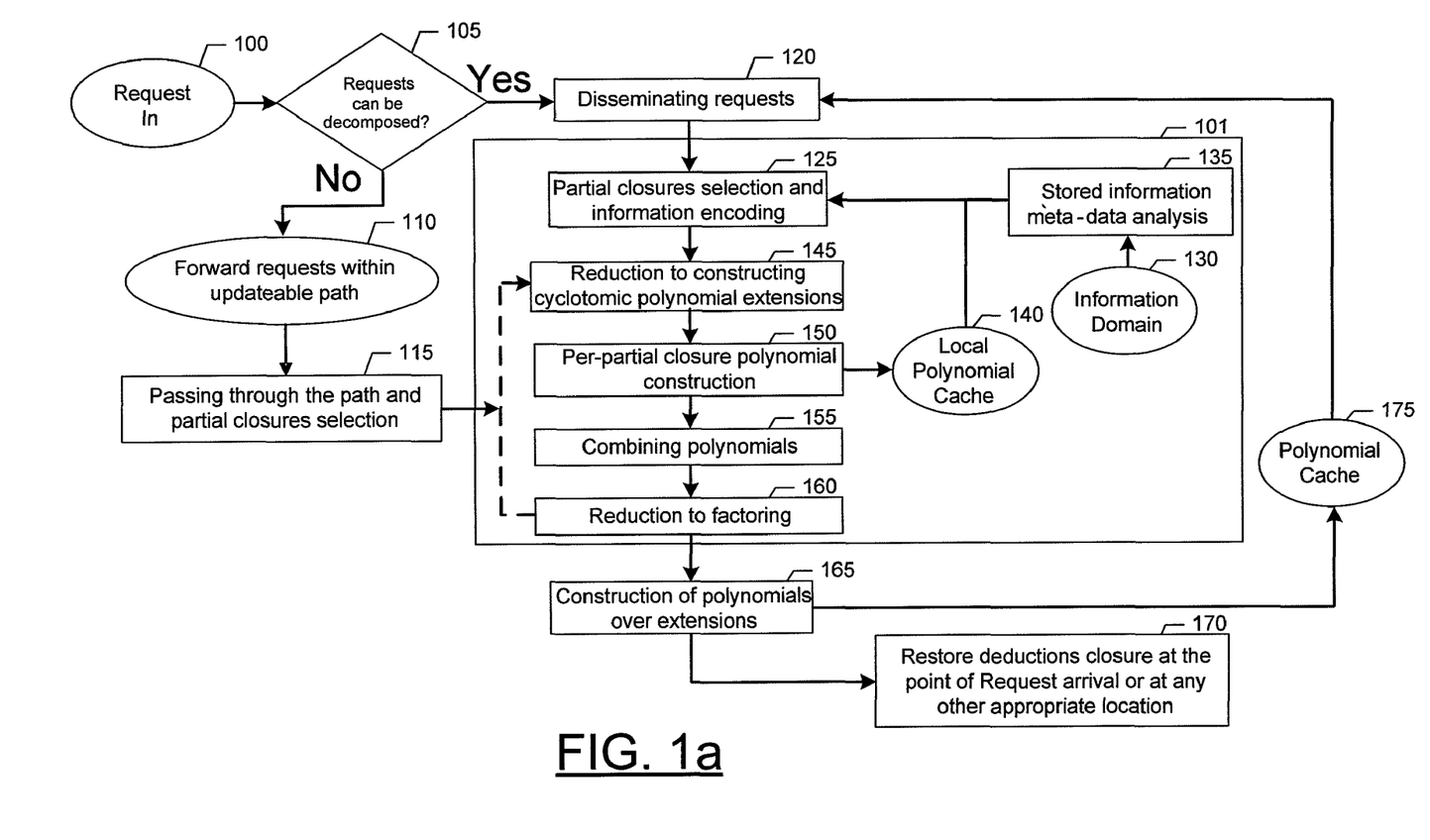
FIG. 1a is an illustration of a flowchart of a method for polynomial-based data transformation and utilization in accordance with various example embodiments of the present invention.

FIG. 1 illustrates a method for facilitating distributed deductive closure synthesis and polynomial-based data transformation and utilization according to example embodiments of the present invention. In this regard, at 100 requests may enter the network (e.g., dynamic distributed device network). The requests may be any type of message, such as, for example, a query or a request to store information. At 105, a determination may be as to whether the requests may be decomposed into component parts. If so, the request may be disseminated within the network at 120. If the request cannot be decomposed, the request may be forwarded within an updateable path 110. The non-decomposable requests may then be passed through a path within the network and a partial closures selection may be undertaken with respect to the requests at 115. The requests may then be acted upon by one or more individual devices of the network to transform the requests as indicated by the link to the single device perspective flow 101.

With respect to the decomposable requests, these requests may be disseminated at 120 and received by one or more devices of the network. Upon receipt, the request may enter the single device perspective flow 101. At 125, a partial closures selection and encoding of the requests may occur. In this regard, the information domain 130 may provide data through a stored information meta-data analysis process 135 for partial closure selection and information encoding at 125. The information domain 130 may be a representation of a data specific domain that provides meta-data, including actual content and query related content. Data specific information may be delivered by a distributed object file system infrastructure and may include meta-data object distribution and hierarchy.

Additionally, a local polynomial cache may provide data for partial closure selection and information coding. At 145, the requests and/or data received via the information domain 130 may be reduced by constructing, for example cyclotomic polynomial extensions. At 150, a per-partial closure polynomial may be constructed and stored in the polynomial local cache 140. The constructed polynomials may be combined at 155. The result may then be reduced via factoring, for example via a mathematical factoring algorithm. The series of operations 145 through 160 may occur at regular or irregular intervals in order to maintain the accuracy of the polynomial expressions relative to the data of the partial closures.

At 165, a construction of the polynomials over or with respect to the extensions (e.g., the cyclotomic polynomial extensions) may be performed. The results may be stored in a polynomial cache 175 for the network. In this regard, the content of the polynomial cache may be disseminated throughout the network at 120, for example, based on a dispersion algorithm. At 170, deductive closures may be restored at the point of the network that received the request or at another appropriate location.

Figure 1B:
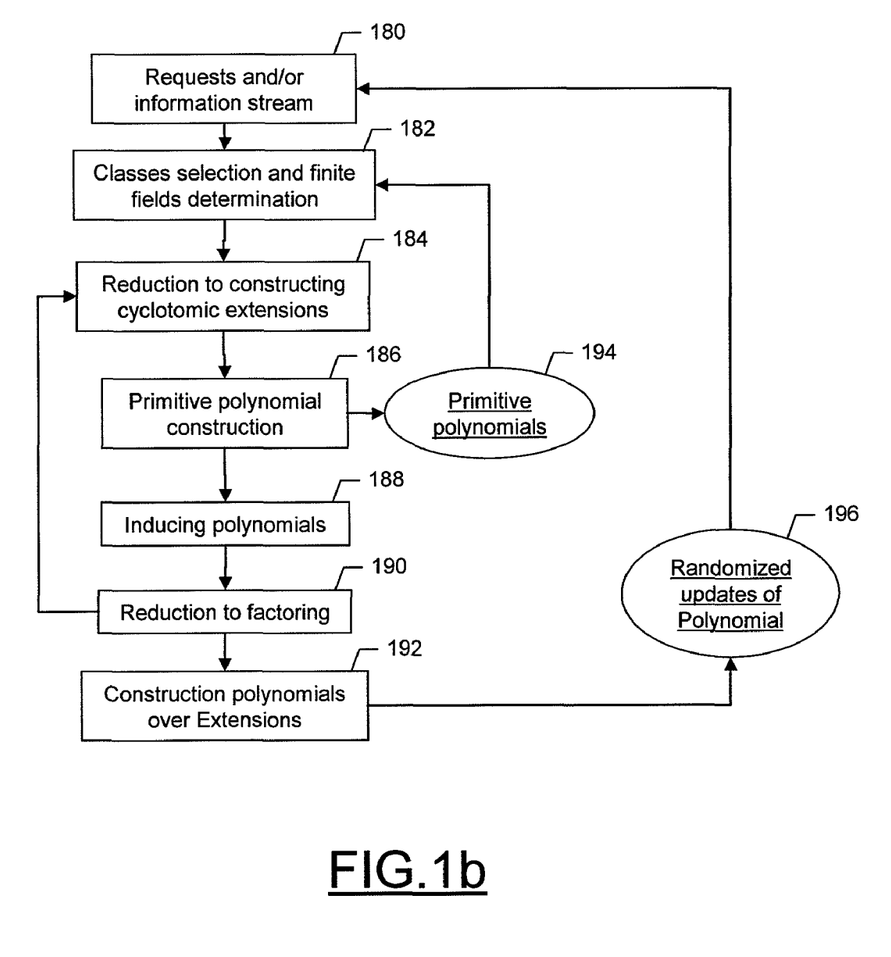
FIG. 1b is an illustration of a flowchart of another method for polynomial-based data transformation and utilization in accordance with various example embodiments of the present invention.

FIG. 1b is an illustration of a flowchart of another method for polynomial-based data transformation and utilization in accordance with various example embodiments of the present invention. At 180, requests (e.g., queries) or an information stream may enter a system that employs example embodiments of the present invention. In this regard, in some example embodiments, an information stream may be indicative of a change in underlying data. At 182, a classes selection and finite fields determination may be performed. At 184, a reduction to constructing cyclotomic extensions may be performed. In this regard, according to some example embodiments, at 184, an information source vector may be generated. Further, at 186, a primitive polynomial construction may be performed. At 194, the primitive polynomials may be retained or stored and a classes selection and finite fields determination may begin again at 182.

Accordingly, at 188, polynomials may be induced in accordance with various example embodiments of the present invention. Further, at 190, a reduction to factoring may be performed. The reduction to factoring may be performed in an iterative manner, and as such, a reduction to constructing cyclotomic extensions may be performed again at 184. Further, after the reduction to factoring at 190, a construction of polynomials over the extensions may occur at 192. As a result, a set of irreducible polynomials or data signatures may be generated. To update (e.g., randomly) the polynomials at 196, the example method may begin again at 180, where requests and/or an information stream may be introduced to the system.

Figure 2:
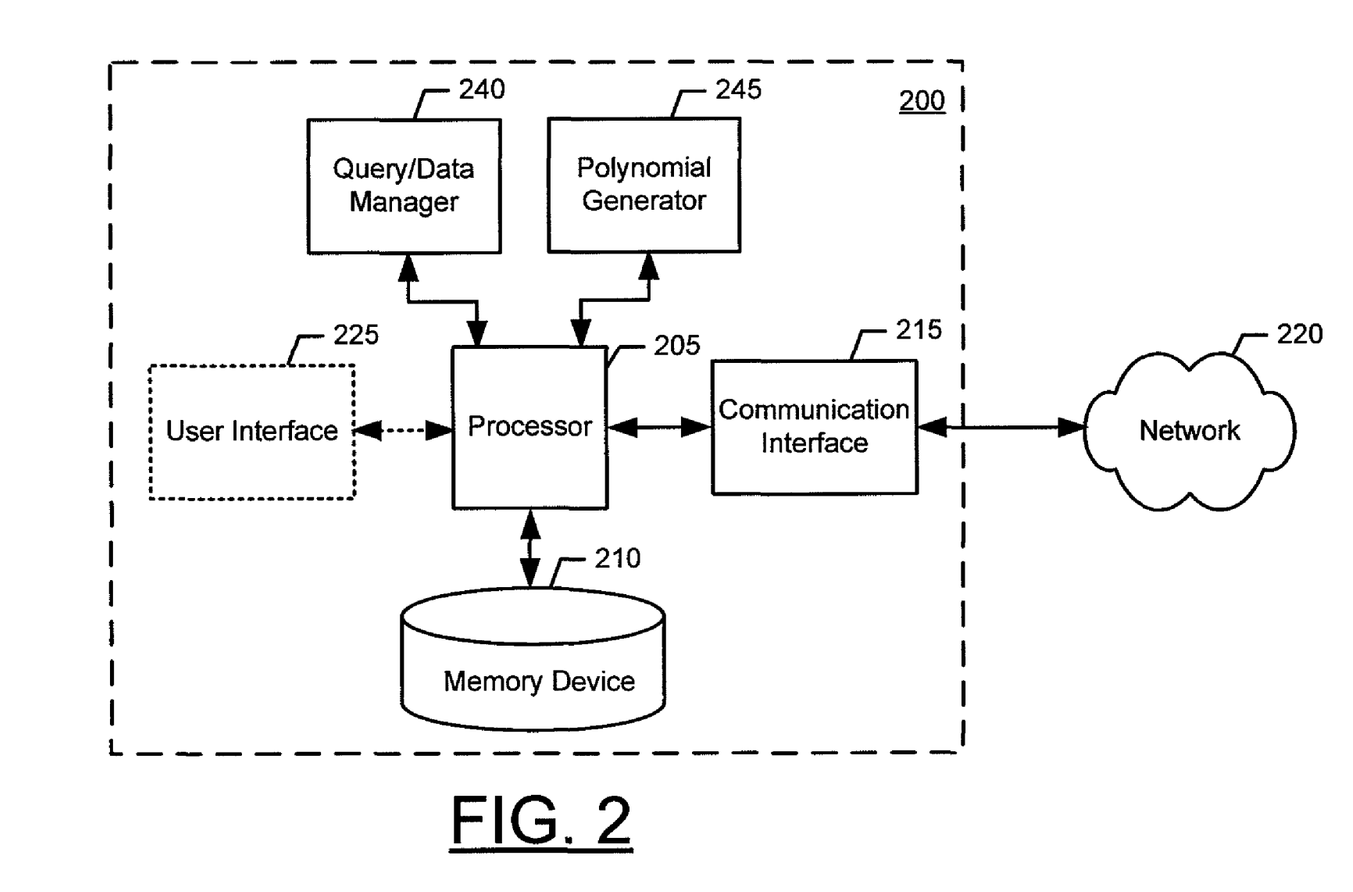
FIG. 2 is block diagram representation of an apparatus for polynomial-based data transformation and utilization according to various example embodiments of the present invention.

FIG. 2 illustrates an example apparatus 200 configured for polynomial-based data transformation and utilization according to various embodiments of the present invention. The apparatus 200, and in particular the processor 205, may be configured to implement the operations and functionality described generally above, such as with respect to generation and dispersion of irreducible polynomials or data signatures and the handling of a query for the retrieval of data. Further, the apparatus 200, and in particular the processor 205 may be configured to carry out some or all of the operations described with respect to FIGS. 1a, 1b, and/or 3.

In some example embodiments, the apparatus 200 may be embodied as, or included as a component of, a computing device and/or a communications device with wired or wireless communications capabilities. Some examples of the apparatus 200 include a computer, a server, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 200 may be configured to implement various aspects of the present invention as described herein including, for example, various example methods of the present invention, where the methods may be implemented by means of a hardware and/or software configured processor (e.g., processor 205), a computer-readable medium, or the like.

The apparatus 200 may include or otherwise be in communication with a processor 205, a memory device 210, and a communications interface 215. Further, in some embodiments, such as embodiments where the apparatus 200 is a mobile terminal, the apparatus 200 also includes a user interface 225. The processor 205 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. With respect to the processor being an FPGA, ASIC, or the like, the processor may be specifically hardware configured to perform the operations of the processor 205 as described herein. In an example embodiment, the processor 205 is configured to execute instructions stored in the memory device 210 or instructions otherwise accessible to the processor 205. Processor 205 may be configured to facilitate communications via the communications interface 215 by, for example, controlling hardware and/or software included in the communications interface 215.

The memory device 210 may be configured to store various information involved in implementing embodiments of the present invention such as, for example, target and data signatures. The memory device 210 may be a computer-readable storage medium that may include volatile and/or non-volatile memory. For example, memory device 210 may include Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the apparatus 200 to carry out various functions in accordance with example embodiments of the present invention. For example, the memory device 210 could be configured to buffer input data for processing by the processor 205. Additionally, or alternatively, the memory device 210 may be configured to store instructions for execution by the processor 205.

The user interface 225 may be in communication with the processor 205 to receive user input at the user interface 225 and/or to provide output to a user as, for example, audible, visual, mechanical or other output indications. The user interface 225 may include, for example, a keyboard, a mouse, a joystick, a display (e.g., a touch screen display), a microphone, a speaker, or other input/output mechanisms. In some example embodiments, the display of the user interface 225 may be configured to present results of a query performed in accordance with embodiments of the present invention.

The communication interface 215 may be any device or means embodied in either hardware, a computer program product, or a combination of hardware and software that is configured to receive and/or transmit data from/to a network and/or any other device or module in communication with the apparatus 200. In this regard, the communication interface 215 may include, for example, an antenna, a transmitter, a receiver, a transceiver and/or supporting hardware, including a processor or a computer program product for enabling communications with network 220. In this regard, network 220 may be a smart space or other dynamic distributed device network. Apparatus 200 may be one of many devices that are part of a dynamic distributed device network (e.g., network 220) defined as a network where devices leave or enter the network at any time. In some example embodiments, network 220 may exemplify a peer-to-peer connection. Via the communication interface 215, the apparatus 200 may communicate with various other network entities.

The communications interface 215 may be configured to provide for communications in accordance with any wired or wireless communication standard. For example, communications interface 215 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

The query/data manager 240 and the polynomial generator 245 of apparatus 200 may be any means or device embodied in hardware, a computer program product, or a combination of hardware and software, such as processor 205 implementing software instructions or a hardware configured processor 205, that is configured to carry out the functions of the query/data manager 240 and/or the polynomial generator 245 as described herein. In an example embodiment, the processor 205 may include, or otherwise control the query/data manager 240 and/or the polynomial generator 245. In various example embodiments, the query/data manager 240 and/or the polynomial generator 245 may reside on differing apparatuses such that some or all of the functionality of the query/data manager 240 and/or the polynomial generator 245 may be performed by a first apparatus, and the remainder of the functionality of the query/data manager 240 and/or the polynomial generator 245 may be performed by one or more other apparatuses.

The query/data manager 240 may be configured to identify data that is relevant to a set of one or more queries. In this regard, the identified data may be identified and located in a memory device accessible via the network 220 or the identified and located data may be stored in the memory device 210. The query/data manager 240 may also be configured to generate an information source vector. The information source vector may be defined so as to indicate information sources associated with the data that are relevant to the set of queries. In some example embodiments, the query/data manager 240 may be configured to perform a verification of the information source vector by generating an equivalence class.

The polynomial generator 245 may be configured to generate a cyclotomic polynomial based on an information source vector. Further, the polynomial generator 245 may be configured to factor the cyclotomic polynomial to generate a plurality of orthogonal data signatures. Further, in some example embodiments, the polynomial generator 245 may also be configured to factor the cyclotomic polynomial to generate the plurality of orthogonal data signatures, where the orthogonal data signatures are irreducible polynomials. In some example embodiments, the polynomial generator 245 may also be configured to update the orthogonal data signatures by factoring a new cyclotomic polynomial generated based on updated data.

According to some example embodiments, the query/data manager 240 may be further configured to direct a dispersion of the orthogonal data signatures to information stores within a dynamic distributed device network. Additionally, or alternatively, the query/data manager 240 may be configured to receive a new query and locate two or more of the orthogonal data signatures based on the new query. The two or more orthogonal data signatures may be located via the network 220 or on the memory device 210.

In this regard, the polynomial generator 245 may be configured to reconstruct the cyclotomic polynomial based on the located orthogonal data signatures. Further, based on the cyclotomic polynomial, the polynomial generator may also be configured to generate a deductive data closure from the cyclotomic polynomial.

Figure 3:
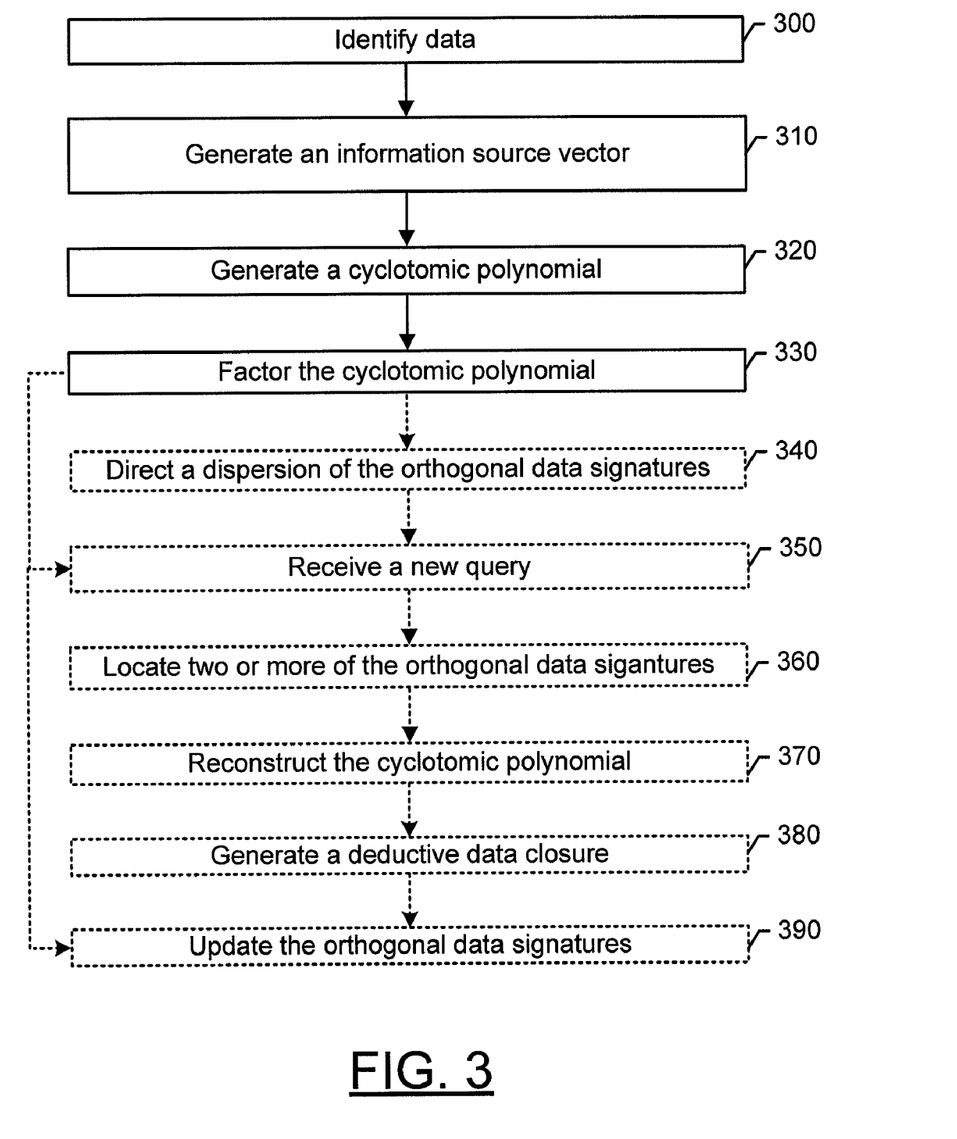
FIG. 3 is an illustration of a flowchart of yet another method for polynomial based data transformation and utilization according to various example embodiments of the present invention.

FIG. 3 and FIGS. 1a and 1b, described above, illustrate flowcharts of a system, method, and computer program product according to example embodiments of the invention. It will be understood that each block, step, or operation of the flowcharts, and/or combinations of blocks, steps, or operations in the flowcharts, may be implemented by various means. Example means for implementing the blocks, steps, or operations of the flowcharts, and/or combinations of the blocks, steps or operations in the flowcharts include hardware, firmware, and/or a computer program product including a memory device storing one or more computer program code instructions, program instructions, or executable computer-readable program code instructions. Example means for implementing the blocks, steps, or operations of the flowcharts, and/or combinations of the blocks, steps or operations in the flowchart also include a processor such as the processor 205. The processor may, for example, be configured to perform the operations of FIGS. 1a, 1b and/or FIG. 3 by performing hardware implemented logical functions, executing stored instructions, or executing algorithms for performing each of the operations. Alternatively, an example apparatus may comprise means for performing each of the operations of the flowcharts. In this regard, according to an example embodiment, examples of means for performing the operations of FIGS. 1a, 1b, and/or FIG. 3 or other operations generally described above include, for example, the processor 205, such as the processor executing an algorithm for processing information as described above, the query/data manager 240 and/or the polynomial generator 245.

In one example embodiment, one or more of the procedures described herein are embodied by a computer program product including program code instructions. In this regard, the program code instructions which embody the procedures described herein may be stored by or on a memory device, such as memory device 210, of an apparatus, such as apparatus 200, and executed by a processor, such as the processor 205. As will be appreciated, any such program code instructions may be loaded onto a computer, processor, or other programmable apparatus (e.g., processor 205, memory device 210) to produce a machine which, in turn, includes means for implementing the functions specified in the flowcharts' block(s), step(s), or operation(s), or as otherwise described generally above. In some example embodiments, these program code instructions are also stored in a computer-readable storage medium that directs a computer, a processor, or other programmable apparatus to function in a particular manner, such that the instructions stored in the computer-readable storage medium produce an article of manufacture which also includes means which implement the function specified in the flowcharts' block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowcharts' block(s), step(s), or operation(s).

Accordingly, blocks, steps, or operations of the flowcharts support combinations of means for performing the specified functions, combinations of steps for performing the specified functions, and program code instructions for performing the specified functions. It will also be understood that, in some example embodiments, one or more blocks, steps, or operations of the flowcharts, and combinations of blocks, steps, or operations in the flowcharts, are implemented by special purpose hardware-based computer systems or processors which perform the specified functions or steps, or combinations of special purpose hardware and program code instructions.

FIG. 3 depicts a flowchart describing an example method for polynomial-based data transformation and utilization. According, to various example embodiments, the operations of FIG. 3 are performed by the processor 205, which may be specifically configured to perform the operations of FIG. 3.

At 300, the example method may include identifying data. In this regard, data may be identified that is relevant to a set of one or more queries. Further, at 310, an information source vector may be generated. The information source vector may indicate information sources that are associated with the data that is relevant to the set of queries. Additionally, at 310, in some example embodiments, generating the information source vector may include performing a verification of the information source vector by generating an equivalence class.

At 320, the example method may include generating a cyclotomic polynomial. The cyclotomic polynomial may be based on the information source vector. Further, at 330, the cyclotomic polynomial may be factored to generate a plurality of orthogonal data signatures. In some example embodiments, the orthogonal data signatures may be irreducible polynomials.

Additionally, or alternatively, at 340, the example method may include directing a dispersion of the orthogonal data signatures to information stores within a dynamic distributed device network. Additionally, or alternatively, at 390, the example method may include updating the orthogonal data signatures by factoring of a new cyclotomic polynomial generated based on updated data.

Additionally, or alternatively, in some example embodiments a new query may be received at 350. At 360, two or more orthogonal data signatures may be located. The two or more orthogonal data signatures may be utilized to reconstruct the cyclotomic polynomial based on the located orthogonal data signatures at 370. Further in this regard, at 380, a deductive data closure may be generated from the cyclotomic polynomial.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code for one or more programs,
the at least one memory and the computer program code configured to, with the at least one processor, cause the apparatus to perform at least the following,
identify data that is relevant to a set of one or more queries;
generate an information source vector that indicates information sources associated with the data that is relevant to the set of queries;
generate a cyclotomic polynomial based on the information source vector; and
factor the cyclotomic polynomial to generate a plurality of orthogonal data signatures.

2. The apparatus of claim 1, wherein the apparatus is further caused to direct a dispersion of the orthogonal data signatures to information stores within a dynamic distributed device network.

3. The apparatus of claim 1, wherein the apparatus is further caused to:
receive a new query;
locate two or more of the orthogonal data signatures;
reconstruct the cyclotomic polynomial based on the located orthogonal data signatures; and
generate a deductive data closure from the cyclotomic polynomial.

4. The apparatus of claim 1, wherein the generation of the information source vector includes performing a verification of the information source vector by generating an equivalence class.

5. The apparatus of claim 1, wherein the apparatus is further caused to update the orthogonal data signatures by factoring of a new cyclotomic polynomial generated based on updated data.

6. The apparatus of claim 1, wherein the orthogonal data signatures comprise irreducible polynomials.

7. The apparatus of claim 1, wherein the apparatus comprises a mobile terminal.

8. A method comprising:
identifying data that is relevant to a set of one or more queries;
generating an information source vector that indicates information sources associated with the data that is relevant to the set of queries;
generating a cyclotomic polynomial based on the information source vector; and factoring, via a processor, the cyclotomic polynomial to generate a plurality of orthogonal data signatures.

9. The method of claim 8 further comprising directing a dispersion of the orthogonal data signatures to information stores within a dynamic distributed device network.

10. The method of claim 8 further comprising:
receiving a new query;
locating two or more of the orthogonal data signatures;
reconstructing the cyclotomic polynomial based on the located orthogonal data signatures; and
generating a deductive data closure from the cyclotomic polynomial.

11. The method of claim 8 further comprising updating the orthogonal data signatures by factoring a new cyclotomic polynomial generated based on updated data.

12. The method of claim 8, wherein the orthogonal data signatures comprise irreducible polynomials.

13. A non-transitory computer-readable storage medium carrying one or more sequences of one or more instructions which, when executed by one or more processors, cause an apparatus to at least perform the following steps:
identifying data that is relevant to a set of one or more queries;
generating an information source vector that indicates information sources associated with the data that is relevant to the set of queries;
generating a cyclotomic polynomial based on the information source vector; and
generating the cyclotomic polynomial to generate a plurality of orthogonal data signatures.

14. The non-transitory computer-readable storage medium of claim 13, wherein the apparatus is caused to further perform:
directing the dispersion of the orthogonal data signatures to information stores within a dynamic distributed device network.

15. The non-transitory computer-readable storage medium of claim 13, wherein the apparatus is caused to further perform:
receiving a new query;
locating two or more of the orthogonal data signatures;
reconstructing the cyclotomic polynomial based on the located orthogonal data signatures; and
generating a deductive data closure from the cyclotomic polynomial.

16. The non-transitory computer-readable storage medium of claim 13, wherein the the generation of the information source vector includes performing a verification of the information source vector by generating an equivalence class.

17. The non-transitory computer-readable storage medium of claim 13, wherein the apparatus is caused to further perform:
updating the orthogonal data signatures by factoring of a new cyclotomic polynomial generated based on updated data.

18. An apparatus comprising:
means for identifying data that is relevant to a set of one or more queries;
means for generating an information source vector that indicates information sources associated with the data that is relevant to the set of queries;
means for generating a cyclotomic polynomial based on the information source vector; and
means for factoring the cyclotomic polynomial to generate a plurality of orthogonal data signatures.

19. The apparatus of claim 18 further comprising means for directing a dispersion of the orthogonal data signatures to information stores within a dynamic distributed device network.

* * * * *